US012579077B2

(12) United States Patent
Kumar et al.

(10) Patent No.: US 12,579,077 B2
(45) Date of Patent: Mar. 17, 2026

(54) LATENCY OPTIMIZED EVICTION ALLOCATION FOR MEMORIES

(71) Applicant: Arm Limited, Cambridge (GB)

(72) Inventors: Akshay Kumar, New Delhi (IN);
Edward Martin McCombs, Jr.,
Austin, TX (US); Bijoy Pazhanimala,
Bangalore (IN); Sean James Salisbury,
Dendron (GB); Andrew David Tune,
Dronfield (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 18/751,741

(22) Filed: Jun. 24, 2024

(65) Prior Publication Data

US 2025/0390440 A1     Dec. 25, 2025

(51) Int. Cl.
*G06F 12/12*          (2016.01)
(52) U.S. Cl.
CPC ................................... *G06F 12/12* (2013.01)
(58) Field of Classification Search
CPC ...................................................... G06F 12/12

USPC ........................................................ 711/154
See application file for complete search history.

(56) References Cited

U.S. PATENT DOCUMENTS

2020/0278931 A1* 9/2020 Bavishi ................. G06F 12/121
2021/0065785 A1* 3/2021 Chong ................. H03K 5/2472

* cited by examiner

*Primary Examiner* — Hua J Song
(74) *Attorney, Agent, or Firm* — Talem IP Law, LLP

(57) ABSTRACT

A method of performing an eviction allocation in memory can include receiving, at memory circuitry, control inputs indicating an eviction allocation operation including a read operation from a plurality of addresses and a write operation to a same plurality of addresses; in response to receiving the control inputs indicating the eviction allocation operation, performing the read operation of the plurality of addresses; and while performing the read operation of the plurality of addresses, loading data to be written to the same plurality of addresses into input registers of write circuitry of the memory circuitry. After a final word is read from the plurality of addresses, the data loaded into the input registers during the read operation can be written to the plurality of addresses.

18 Claims, 9 Drawing Sheets

340

CLK

BSTEN

EVAN

Address enable
(BSTA)

State machine

342

CLK

Address enable
(BSTA)

Registers

344

Various circuitry

346

| State of Control Signal S1 | |
| --- | --- |
| Condition | |
| Write that is not blast EVA | 0 |
| Blast EVA | 1 |

| State of Control Signal S2 | |
| --- | --- |
| Condition | |
| (Write that is not blast EVA && 1st CLK) || (Blast EVA && 3rd CLK) | 0 |
| All other cases | 1 |

Blast Eviction-Allocation Sequence of Operations

LATENCY OPTIMIZED EVICTION ALLOCATION FOR MEMORIES

BACKGROUND

Memory eviction refers to the processes related to removing data from a cache or other memory subsystem. Memory eviction is often carried out to make room for new or more relevant (e.g., more likely to be used) information. Memory allocation refers to the processes of assigning, or reserving, memory locations for storing data. During operation, data can be removed/read and replaced/written using eviction and allocation processes.

Random Access Memory (RAM) is a type of volatile memory typically used as the main or primary memory for a processing unit and stores the programs and data that the processing unit is using during execution of a program. Static Random Access Memory (SRAM) is typically the type of memory used for caches. SRAM is generally configured as an array, or matrix, of memory units that are individually addressable. Read and write operations are performed on units of data referred to as words. That is, a word refers to a unit of data used by a particular processor design or instruction set.

In general, wordlines are used to select a row for reading or writing and bitlines carry data to/from a column. For the read operation in SRAM, the address of a storage location for a word is transferred to an address line, a pre-charge circuit is used to bring bitlines to VDD, the wordline is driven high (pre-charge circuit is turned off), the cells storing the data at the storage location pull down one bitline, and a sense circuit on a periphery of the array is activated to capture the value on the bitlines. For the write operation in SRAM, the address of a desired word is transferred to a specific address on the wordline and column, data bits to be stored in the memory are transferred to the bitlines, which are driven by a column driver circuit, and the write control is activated to drive the wordline high (while the column driver stays on) and drive the data into the cells being written. Thus, in a typical eviction-allocation scenario, one or more words individually are evicted by going through the read operation processes (and corresponding clock cycles) and then one or more words can be individually allocated by going through the write operation processes.

BRIEF SUMMARY

Latency optimized eviction allocation for memories is described. Through the described methods and systems supporting high throughput reads and writes, it is possible to perform two read operations (eviction) on two columns of the same wordline, and then two write operations (allocation) on the same two columns of the same wordline of a 2-cycle memory in four cycles. Moreover, it is possible to do one read operation and one write operation to the same address of a 2-cycle memory in three cycles.

A method of performing an eviction allocation in memory can include receiving, at memory circuitry, control inputs indicating an eviction allocation operation including a read operation from a plurality of addresses and a write operation to a same plurality of addresses; in response to receiving the control inputs indicating the eviction allocation operation, performing the read operation of the plurality of addresses; and while performing the read operation of the plurality of addresses, loading data to be written to the same plurality of addresses into input registers of write circuitry of the memory circuitry.

A control circuit of a memory circuitry can be provided that is structured to receive control inputs including a blast enable signal, an address enable signal, and an evict-allocate enable signal, wherein the control circuit includes: a state machine including a plurality of state elements corresponding to a maximum number of available columns of a blast operation and an additional state element, wherein the plurality of state elements operate based on the address enable signal and the additional state element operates based on the evict-allocate enable signal.

A memory circuitry for eviction allocation can include: a memory array; read circuitry; write circuitry; and a control circuit coupled to the read circuitry and the write circuitry for operating the read circuitry and the write circuitry based on control inputs to the control circuit. When the control inputs indicate an eviction allocation operation that includes a read operation from a plurality of addresses and a write operation to a same plurality of addresses, the control circuit directs the read circuitry to read out a plurality of words from the plurality of addresses and, while the control circuit directs the read circuitry to read out the plurality of words, the control circuit directs the write circuitry to load a plurality of new words to be written to the same plurality of addresses into input registers of the write circuitry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Latency optimized eviction allocation for memories is described. In the described latency optimized eviction allocation operations, while performing a read operation, the data to be written into the address(es) being read are loaded into the input registers. By starting operations for a write during a read stage, it is possible to reduce the total number of cycles for achieving eviction and allocation of a same memory location. By combining the described systems and methods supporting the latency optimized eviction allocation with circuitry for high throughput reads and writes, it is possible to perform eviction-allocation operations in fewer cycles than otherwise available.

A "blast mode" refers to a selectable mode of a memory circuitry in which more than one word is written or read on a given wordline across multiple columns which results in increased throughput. In addition to the ability to support increased throughput read and write operations, memory circuitry is provided that can perform an evict-allocate operation of one or more than one word during a same access operation. With the multiple word read and write operations occurring during a same access operation, power efficiencies are also able to be realized.

Figure 1:
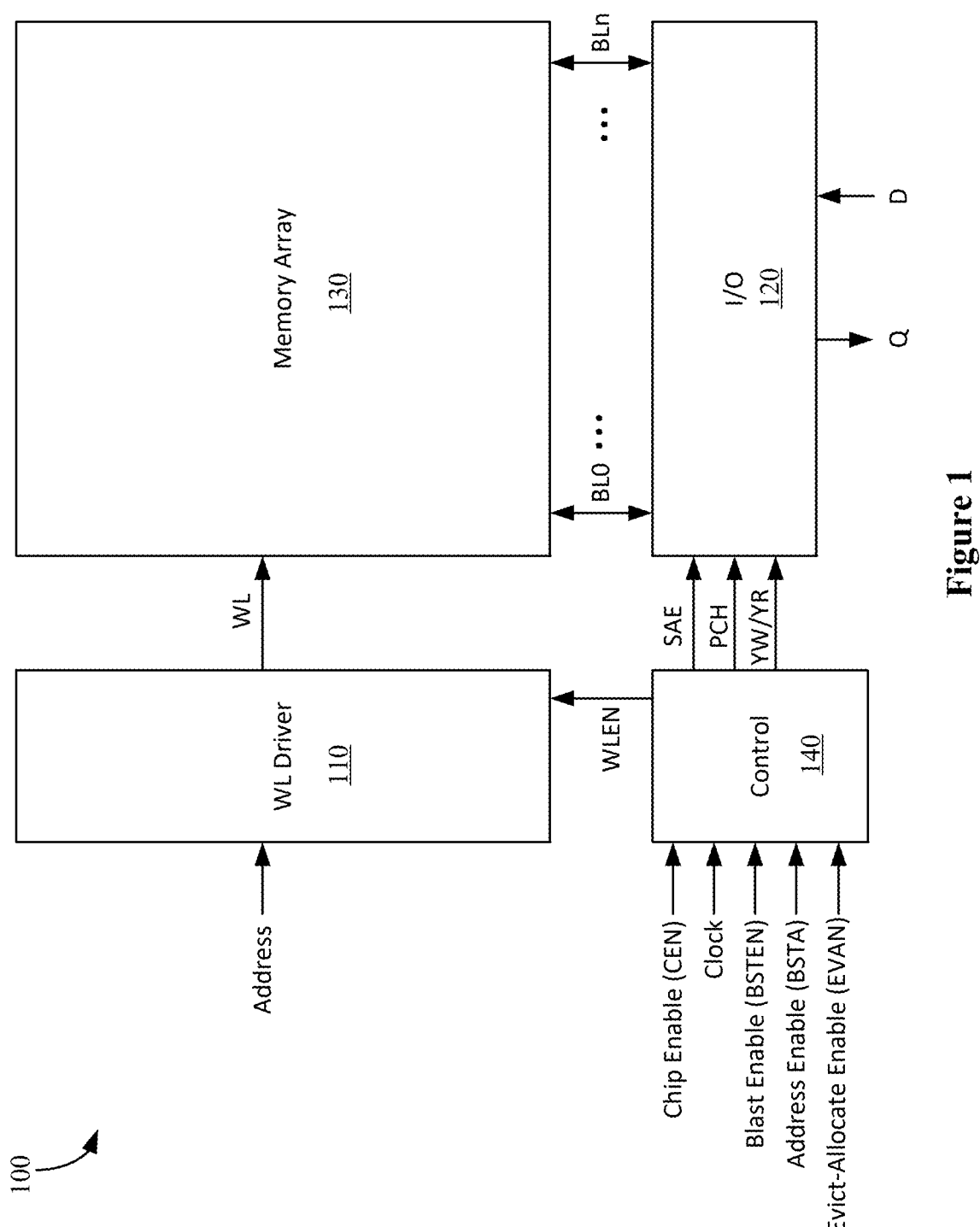
FIG. 1 shows a representational diagram of a memory circuitry supporting high throughput read and write operations with an evict-allocate mode.

FIG. 1 shows a representational diagram of a memory circuitry supporting high throughput read and write operations with an evict-allocate mode.

Referring to FIG. 1, memory circuitry 100 includes a wordline (WL) driver 110 and input/output circuitry 120 for a memory array 130. The WL driver 110 and the input/output circuitry 120 operate under the control of a control circuit 140. The memory array 130 is structured in an array with rows accessed by wordlines and columns accessed by bitlines (with each column having a bitline and its complement, the bitbar line). In certain implementations, the memory array 130 is a static random access memory (SRAM). The bitcell structure of the memory can be 1:1:1 bitcells, 1:1:2 bitcells, or 1:2:2 bitcells, as examples. The bitcells may be implemented in FinFET processes, planar processes, nanosheet processes, FDSOI processes, or other suitable technologies. A bitcell refers to the memory element storing a single bit of information.

The control circuit 140 can receive a chip enable (CEN) signal, a clock signal, a blast enable (BSTEN) signal, an address enable (BSTA) signal, and an evict-allocate enable (EVAN) signal, as well as other signals (not shown), and can generate outputs to control the WL driver 110 and the I/O circuitry 120. The chip enable (CEN) signal indicates whether the memory will be accessed or not (and can be considered a signal providing an indication of a memory access). The clock signal indicates the start of an operation for memory and provides the operating frequency for the circuitry. The blast enable (BSTEN) signal indicates whether the operation being performed at the memory is in blast mode. The address enable (BSTA) signal supports out-of-order bitcell access. Out-of-order bitcell access refers to the ability to write or read (or otherwise access) bitcells on a non-consecutive basis. That is, by using the address enable (BSTA) signal, which indicates which bitlines are going to be accessed during the blast mode, it is possible to have multiple words read or written to non-consecutive bitcells of a row. The evict-allocate enable signal (EVAN) indicates whether the operation being performed at the memory is for an eviction-allocation (in which a read-then-write is performed on one address of the memory). When both blast enable and evict-allocate enable are active, a "blast eviction allocation" is possible in which an evict-allocate operation of more than one word during a same access operation can occur.

The WL driver 110 receives an address and turns on a wordline indicated by the address in response to receiving a wordline enable (WLEN) signal from the control circuit 140.

The input/output circuitry 120 can include write circuitry and read circuitry. The write circuitry may be implemented as described with respect to FIGS. 4A and 5. The read circuitry can include a sense amplifier coupled to each column or a sense amplifier coupled to a set of columns, where a readout multiplexer controlled by column select signals can be used, depending on implementation. Data (D) is received for write operations and Data (Q) is output for read operations. The input/output circuitry 120 receives a sense amplifier enable (SAE) signal, a precharge (PCH) signal (which can be used for precharging bitlines and precharging sense amplifier(s)), and a column select (YW/YR) signal from the control circuit 140.

In the case of write operations, the control circuit 140 provides a precharge (PCH) signal and a write column select (YW) signal to write circuitry of the input/output circuitry 120. For a multi-cycle operation such as a blast write of at least two words, bitlines are precharged and once the words of the at least two words are loaded, the column select signals are applied and the bitcells are written (see e.g., FIGS. 4A, 4B, and 5). In the case of read operations, the control circuit 140 provides a sense amplifier enable (SAE) signal, a precharge (PCH) signal, and a read column select (YR) signal to read circuitry of the input/output circuitry 120. For a multi-cycle operation such as a blast read of at least two words, one or more sense amplifiers coupled to columns of the memory array 130 (specific configuration depending on circuit implementation) are enabled (using SAE) and precharged for each word being read.

In the case of an eviction allocation, both types of outputs (e.g., read operation control and write operation control) are provided by the control circuit 140 so that while performing the read operation, data to be written is loaded into the input registers in advance of writing the data. In the case of a blast eviction allocation, the read operation continues until all words are read and the words to be written are all loaded in the input registers in accordance with the blast read and blast write operations.

Figure 2:
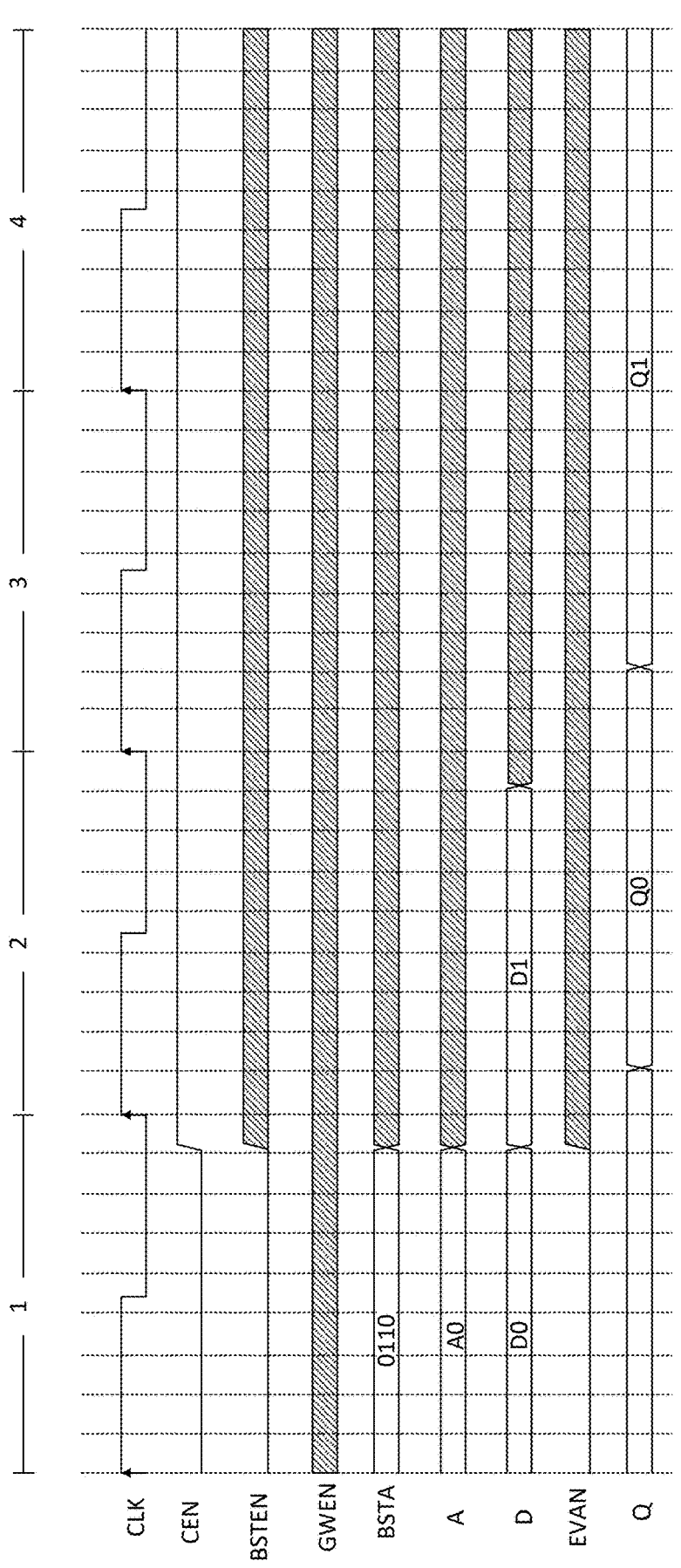
FIG. 2 illustrates a timing diagram for a blast eviction allocation operation.

FIG. 2 illustrates a timing diagram for a blast eviction allocation operation. Referring to FIG. 2, a blast eviction allocation operation for evicting and allocating two words in a same access is shown. Input signals to a control circuit (e.g., control circuit 140) are shown and include the clock signal (CLK), chip enable (CEN), blast enable (BSTEN), write enable (GWEN), address enable signal (BSTA), and an evict-allocate enable signal (given here as EVAN). Input data line (D) and output data line (Q) are also shown (which are as a result of control circuit operations based on the inputs to the control circuit). The address bus (A) controls which row of the memory will be accessed during the operation.

The rising edge of the clock (CLK) is used to initiate operations. At the start of the first clock cycle (clock cycle number 1), CEN is active (active low), blast enable BSTEN is active (active low), write enable (GWEN) is ignored (since in an eviction-allocation operation, both read and write occur), and evict-allocate enable (EVAN) is active (active low). As can be seen, the address enable (BSTA) signal sets the depth of the blast and indicates which of the four columns are to be accessed for blast mode. In this example, BSTA is 0110 indicating the operation is of a depth of 2, and the middle two columns are to be accessed. Outside data of D0 is captured in clock cycle number 1 and D1 is captured in clock cycle number 2. In clock cycle number 2, Q0 is output/read and in clock cycle number 3, Q1 is output/read. Starting from here and ending in the fourth cycle, the read operations are closed and the write is performed to write the two words (D0 and D1) that were captured in input registers at the same addresses that were just read.

Figure 5:
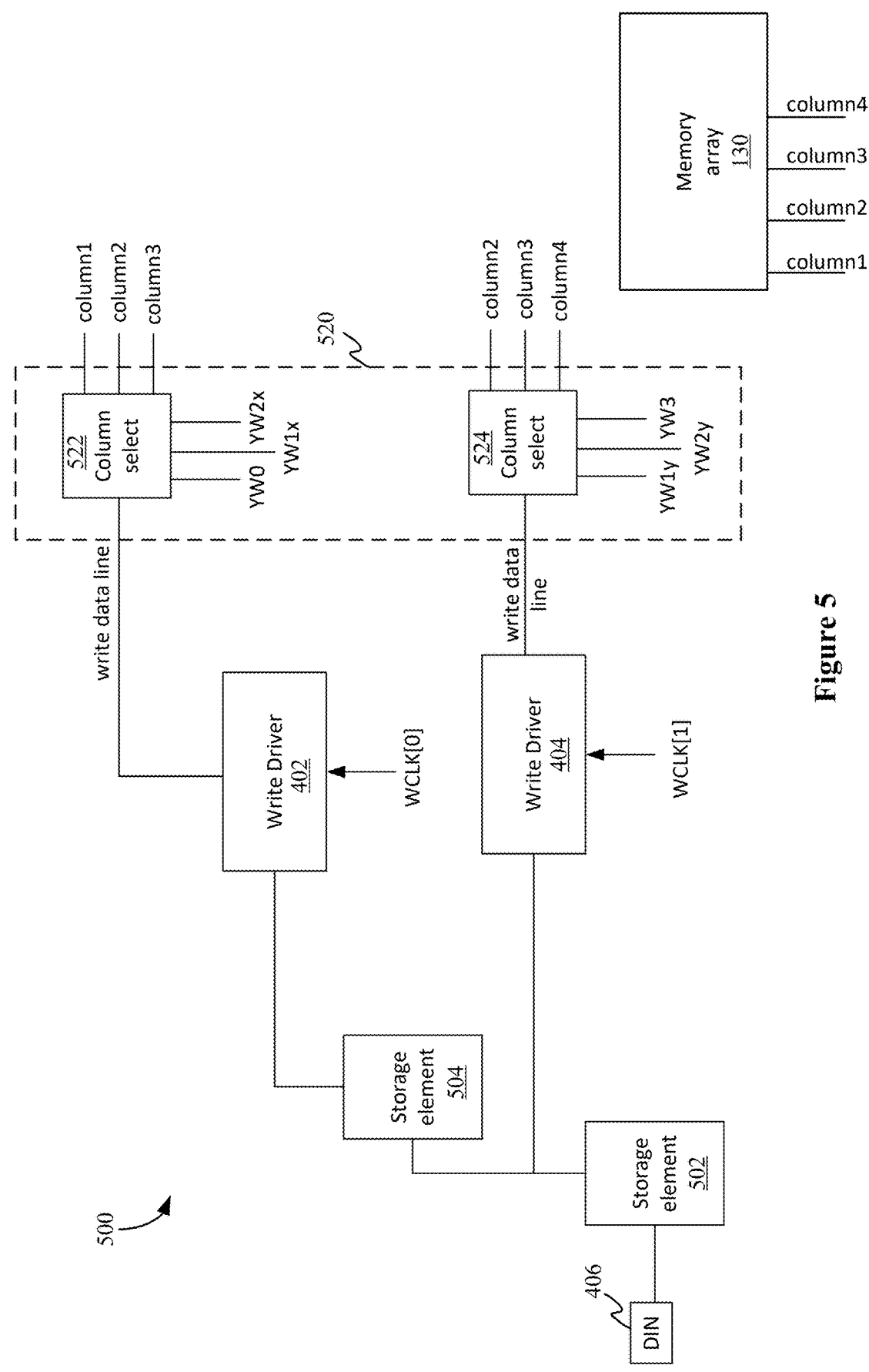
FIG. 5 illustrates an example circuit configuration for write circuitry supporting up to two words in a blast write operation.

It should be understood that more words can be evicted and allocated in the blast eviction allocation operation when the input/output circuitry of a memory circuitry supports the blast write of more than two words (e.g., through additional circuitry such as explained with respect to FIG. 5). In such cases, each additional word can add a clock cycle.

For example, a method of performing an eviction allocation in memory can include receiving, at memory circuitry (e.g., memory circuitry 100), control inputs indicating an eviction allocation operation, which includes a read operation from a plurality of addresses and a write operation to a same plurality of addresses. These control inputs indicating the eviction allocation operation can be an evict-allocate enable signal (e.g., EVAN), a blast enable signal (e.g., BSTEN), and an address enable signal (e.g., BSTA). With the evict-allocate enable signal and the blast enable signal being active, a blast eviction allocation operation can be performed. Thus, in response to receiving the control inputs indicating the eviction allocation operation, a read operation of the plurality of addresses can be performed; and while performing the read operation of the plurality of addresses, data to be written to the same plurality of addresses is loaded into input registers of write circuitry of the memory circuitry. During a final cycle of the read operation of the plurality of addresses, the data can be triggered to be written to be stored at the plurality of addresses, and the write operation (and thereby the eviction allocation operation) is closed in a next cycle. In various implementations, for n number addresses being accessed by the eviction allocation operation, an n+1 cycle is the final cycle of the read operation and an n+2 cycle is the closing of the write operation. Indeed, it is possible to load a first new word of the data to be written into a first input register in a first cycle of the read operation and load a second new word of the data to be written into a second input register in a second cycle of the read operation. In this manner, the data to be written is ready for being stored at the plurality of addresses upon completion of reading from those same plurality of addresses.

Figure 3A:
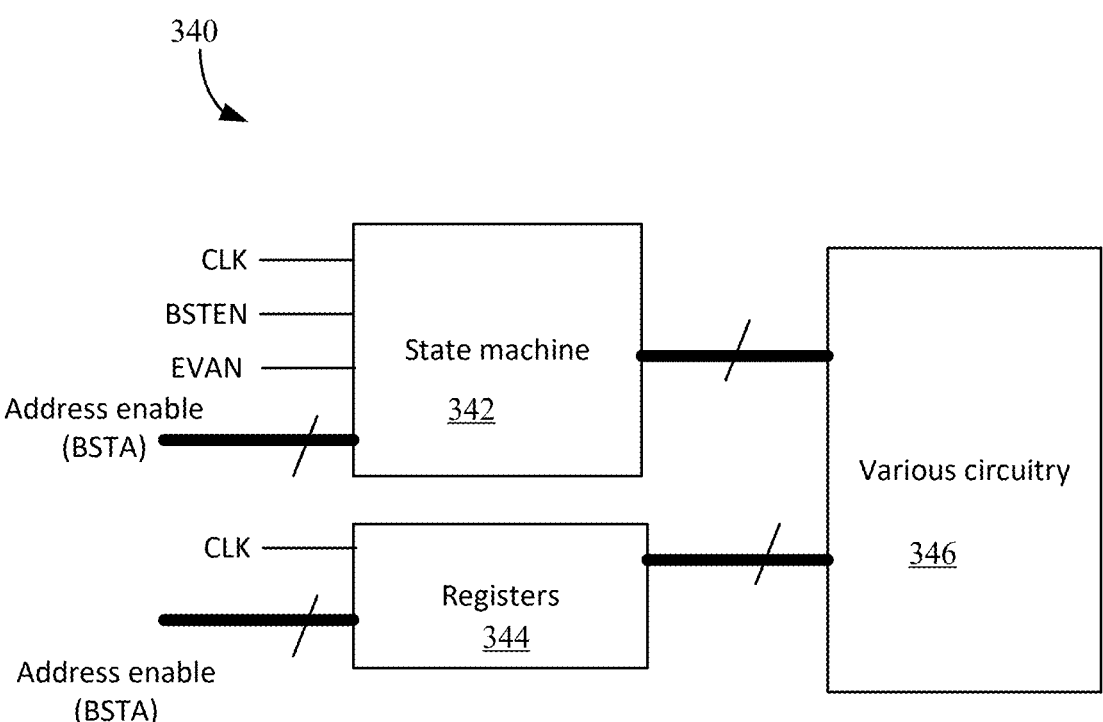
FIG. 3A illustrates a representation of control circuitry for a blast eviction allocation operation.
Figure 3B:
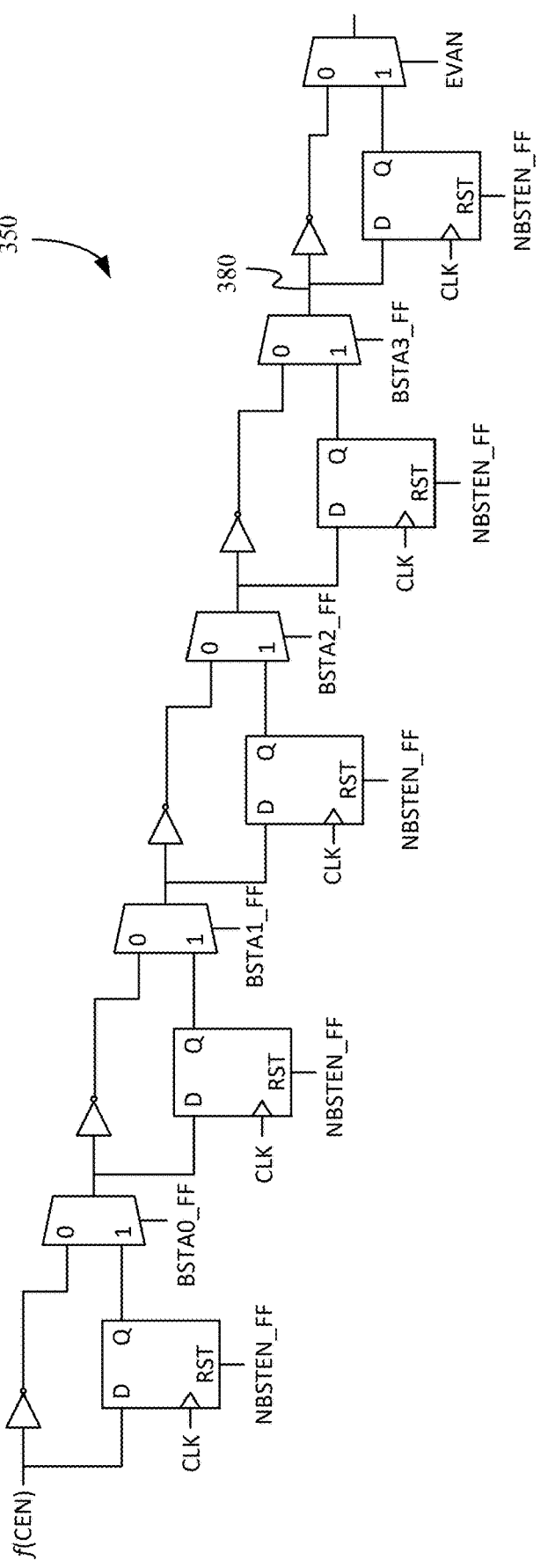
FIG. 3B illustrates an example state machine that can be used as part of the control circuitry for a blast eviction allocation operation.

FIG. 3A illustrates a representation of control circuitry for a blast eviction allocation operation; and FIG. 3B illustrates an example state machine that can be used as part of the control circuitry for a blast eviction allocation operation.

Referring to FIG. 3A, control circuit 340, which can be used in control circuit 140 as in FIG. 1, includes a state machine 342, a set of registers 344, and various circuitry 346 for generating control signals for operating a memory in modes including the described evict-allocate modes. The state machine 342 includes a number of state elements that can correspond to a maximum number of cycles available to carry out operation of various modes of the memory, including a blast operation for memory. The state machine is structured to receive a clock (CLK), an input associated with a memory access (e.g., based on CEN), a blast operation enable (BSTEN), an evict-allocate mode enable (EVAN), and address enable bits (BSTA), and to output intermediate state element outputs and a final state element output. The state machine 342 may be implemented based on the state machine shown in FIG. 3B.

Registers of the set of registers 344 can store values of an address enable signal (BSTA) and can be used, in conjunction with the state machine, by the various circuitry 346.

The various circuitry 346 includes column select circuitry used to select the appropriate columns for a multi-word write or read as well as other circuitry that generates various signals supporting the high throughput read and write operations so that operations can be started and completed at the appropriate times.

In FIG. 3B, a simple representation of a state machine 350 is shown that can be implemented in the control circuit 140 for a memory such as described with respect to FIG. 1, for example, implementing state machine 342 of FIG. 3A. The intermediate and final signals output by state machine 350 can be used by various circuitry of the control circuit for supporting the eviction-allocation mode, among other available modes supported by the memory circuitry. Referring to FIG. 3B, the state machine 350 includes five state elements using five shift registers and five multiplexers. Each multiplexer is disposed between stages of the state machine. The first four state elements (with corresponding shift registers and multiplexers) are used to control column selection and other operations occurring during certain clock cycles of a memory access.

An input to the state machine 350 is a signal that is based on the chip enable signal (referred to in the drawing as f(CEN)) The blast enable signal (BSTEN) can be used to reset the shift registers (e.g., based on a value captured into a flip-flop—not shown). The value on the address select signal (e.g., BSTA[3:0]) can also be captured into flip-flops (not shown) in a first clock cycle. The values captured into the flip-flops are output as BSTA0_FF, BSTA1_FF, BSTA2_FF, and BSTA3_FF and used to control the four multiplexers located between the states of the state machine.

For any multiplexer, if the control line is '1', then there is a delay of 1 clock cycle before the output updates. If the control line is '0', then the output updates in the same clock cycle. Therefore, if BSTA=1001, then the intermediate node 380 after the fourth state element toggles in 2 cycles (since there are 2 ones in the BSTA); and if BSTA=1111, then the intermediate node 380 after the fourth state element toggles in 4 cycles (since there are 4 ones in the BSTA). The eviction-allocation enable (EVAN) signal controls the final multiplexer, providing the additional cycle used to complete the eviction allocation operations. Therefore, when the memory is in non-blast eviction-allocation mode, the state machine 350 in FIG. 3B generates a control signal indicating the end of the operation in a number of cycles equal to the number of ones in the BSTA plus one. When the memory is in a blast eviction-allocation mode, the state machine 350 in FIG. 3B generates a control signal indicating the end of the operation in a number of cycles equal to the number of ones in the BSTA plus two. The extra cycle is used to do the concurrent write (allocation).

It should be understood that more or fewer state elements may be provided for a state machine suitable for the control circuit described herein. That is, a state machine can be provided that includes a first number of state elements corresponding to a maximum number of available columns of a blast operation and an additional state element. The first number of state elements can operate based on the address enable signal and the additional state element operates based on the evict-allocate enable signal.

Accordingly, when the evict-allocate enable (EVAN) signal and the blast enable (BSTEN) signal are active, the control circuit is able to direct the read circuitry to read out a plurality of words from a plurality of addresses in consecutive cycles and, while the control circuit directs the read circuitry to read out the plurality of words, the control circuit can direct the write circuitry to load a plurality of new words to be written to a same plurality of addresses into input registers of the write circuitry.

Figure 4B:
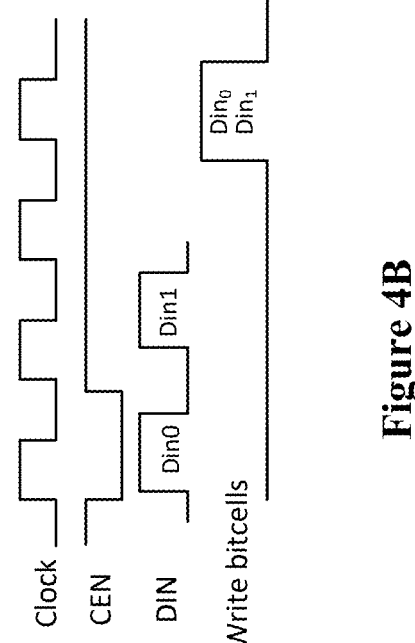
FIG. 4B illustrates a corresponding timing diagram for the write circuitry of FIG. 4A.
Figure 4A:
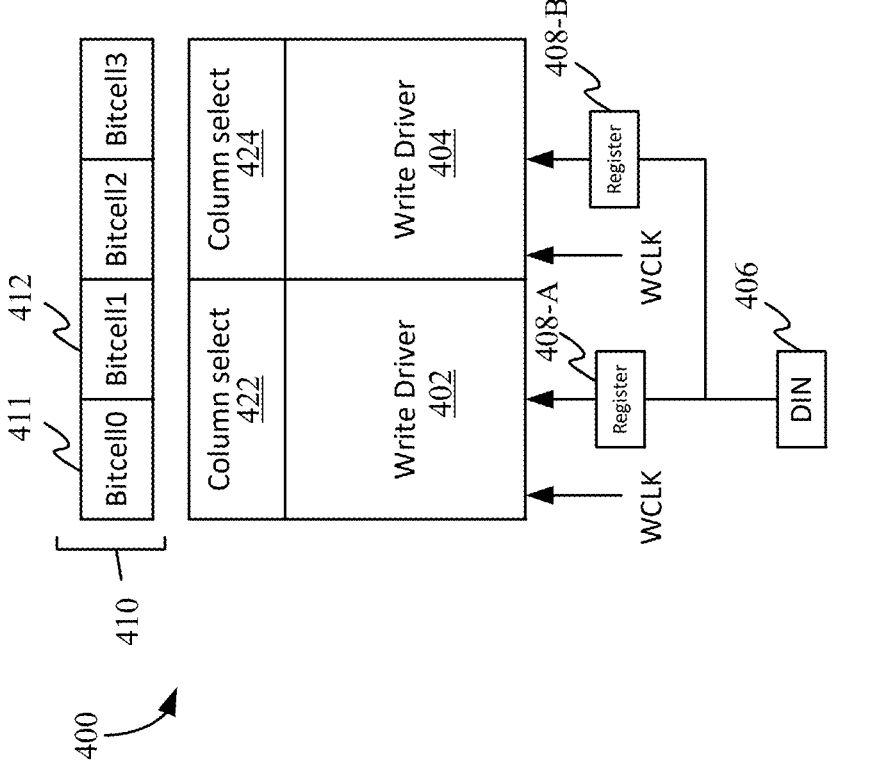
FIG. 4A illustrates an example write circuitry supporting a high throughput write operation.

FIG. 4A illustrates an example write circuitry supporting a high throughput write operation; and FIG. 4B illustrates a corresponding timing diagram for the write circuitry of FIG. 4A. Although circuitry for a blast write of two words is shown, by the inclusion of additional circuitry (including corresponding input registers), it is possible to support writing more than two words during a same access.

Referring to FIG. 4A, a two-word configuration 400 for write circuitry can include a first write driver 402 to a set of bitlines and a second write driver 404 to the set of bitlines. The first write driver 402 and the second write driver 404 can each be selectively coupled to all the bitlines of the set of bitlines or subsets (including overlapping subsets) of the bitlines of the set of bitlines. Both the first write driver 402 and the second write driver 404 receive their input through the same data input pin (DIN) 406 for the set of bitlines, where the data received for the first write driver 402 and the second write driver 404 is captured before writing to the bitcells at corresponding input registers (e.g., 408-A, 408-B). In the illustrated scenario, the two-word configuration 400 involves a selection of two bitcells from four bitcells 410 in a same row that are accessible by the set of bitlines coupled to the first write driver 402 and the second write driver 404. To select between the bitcells, column select circuitry is included for each write driver. The column select circuitry can select between one, two, three, or more bitline pairs of the set of bitlines, depending on implementation.

As illustrated in FIG. 4A, the write circuitry can include a first column select circuitry 422 for selecting a particular bitline of the set of bitlines for the first write driver 402 and a second column select circuitry 424 for selecting a corresponding particular bitline of the set of bitlines for the second write driver 404 such that the first word (e.g., as captured into a first input register 408-A) is written to one bitcell (e.g., bitcell 411) coupled to the particular bitline and the second word (e.g., as captured into a second input register 408-B) is written to another bitcell (e.g., bitcell 412) coupled to the corresponding particular bitline. The particular bitline selected by the first column select circuitry 422 is the selected bitline pair (i.e., bitline and bitline bar) for the first write driver 402. The corresponding particular bitline selected by the second column select circuitry 424 is the selected bitline pair for/corresponding to the second write driver 404. The column select circuitry (e.g., first column select circuitry 422, second column select circuitry 424) can be implemented as a MUX. In some cases, the column select circuitry is implemented using pass gates.

Referring to FIG. 4B, for the blast write operation component of the blast eviction-allocation operation, in a first clock cycle, a first word (Din0), is loaded (e.g., to input register 408-A). Then, a second word (Din1) is loaded (e.g., to input register 408-B) during the second clock cycle. In a blast write, the two words would be triggered to be stored in the memory such that both words are concurrently written by the end of the third clock cycle. However, for the blast eviction allocation, the two words (Din0 and Din1) are triggered to be stored in the memory such that both words are concurrently written by the end of the fourth clock cycle so that the last word that was stored at a second address (which will be written to) can be read out before the new words are written. An example implementation for control of the timing in this manner is shown in and described with respect to FIGS. 6, 7A, and 7B. As described with respect to FIGS. 3A and 3B, the additional state element (and EVAN signal) can control when operations complete so that the words are triggered to be concurrently written to the memory location by the final clock cycle of the access.

FIG. 5 illustrates an example circuit configuration for write circuitry supporting up to two words in a blast write operation. Referring to FIG. 5, write circuitry 500 includes a first storage element 502 and a second storage element 504 for capturing up to two words via DIN 406.

For a two-word blast write configuration, two data bus inputs are captured—Din0 and Din1 (see e.g., FIG. 4B), which are to be written to two columns on the same row, as determined by an address enable signal (BSTA) that is used by a control circuit 140 to generate the column select signals YW. Instead of doubling the width of the input bus, time-multiplexing is used.

Figure 6:
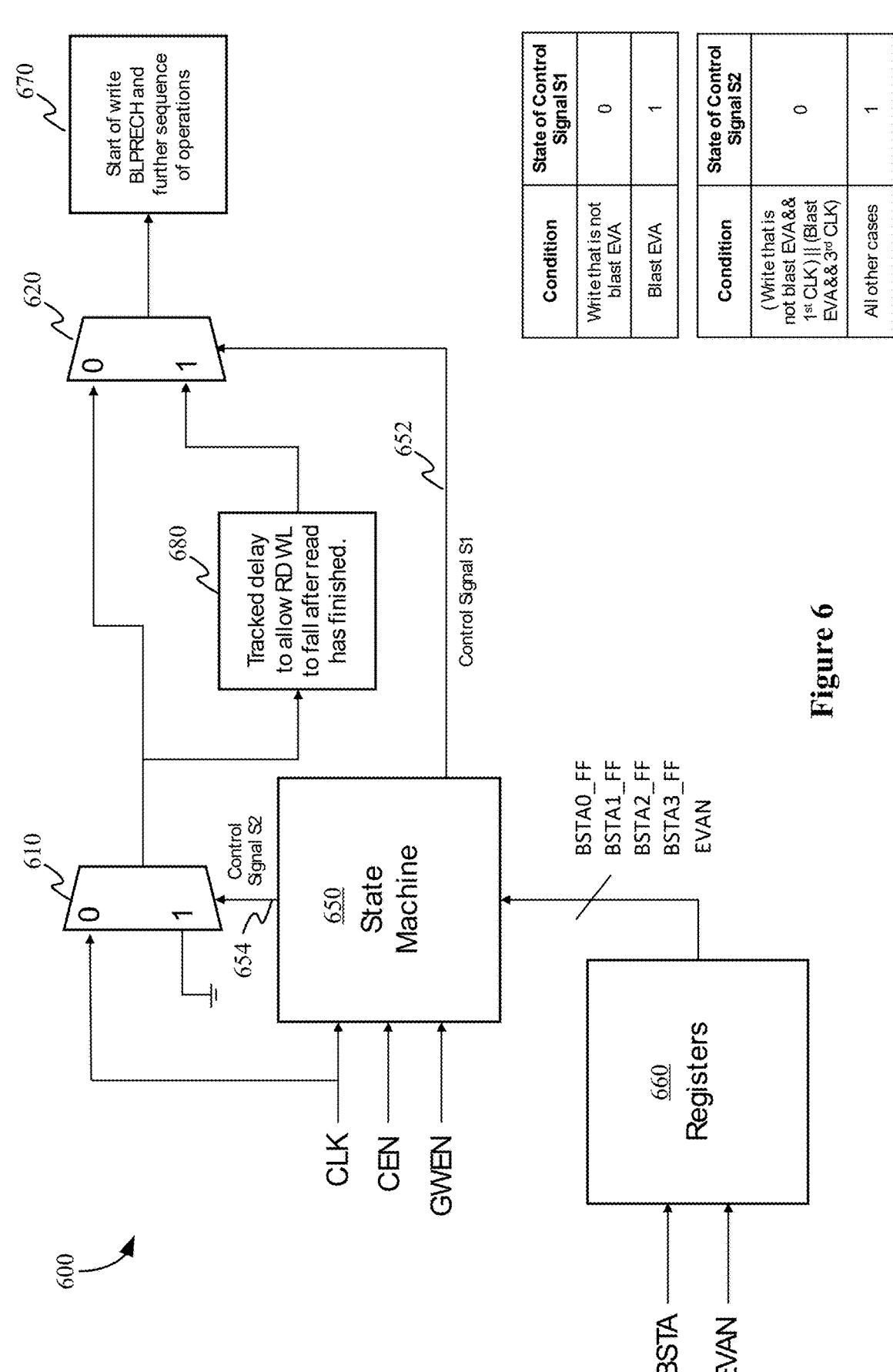
FIG. 6 illustrates a control circuit configuration for controlling the start of the write operation in blast eviction-allocation.

As previously shown and described with respect to FIGS. 2, 4A, and 4B, the $1^{st}$ word (DIN0) can be captured off the $1^{st}$ edge of the CLK, and the $2^{nd}$ word (DIN1) can be captured off the $2^{nd}$ edge of the CLK, and both can be stored in storage elements (e.g., also shown as input registers 408-A, 408-B of FIG. 4A). For a blast write, both data inputs (DIN0, DIN1) are then written into the memory starting on the $2^{nd}$ edge of the clock and finishing on the $3^{rd}$ edge. For a blast eviction allocation, both data inputs are written into the memory starting on the $3^{rd}$ edge of the clock and finishing on the $4^{th}$ edge. FIG. 6 shows an example of a control circuit supporting this writing delay.

In some cases, first storage element 502 and second storage element 504 can be configured as a D flip flop followed by a latch. In this manner, in operation, Din0 will be saved in the first cycle to both the D flip flop (as the first storage element 502) and the latch (as the second storage element 504). In the second cycle, the latch will remain closed and the D flip flop is updated with the second word Din1.

Write circuitry 500 further includes first write driver 402 (e.g., as described with respect to FIG. 4A) and at least one additional write driver for a set of bitlines coupled to bitcells of the memory (e.g., memory array 130). In this implementation, the set of bitlines are for four columns of bitlines (labeled column1, column2, column3, and column4). In addition, as described with respect to FIG. 4A, for supporting up to two words, the at least one additional write driver is one additional write driver—the second write driver 404.

Write circuitry 500 further includes column select circuitry 520 coupled to the first write driver 402 and the second write driver 404 for selecting bitlines of the set of bitlines. In this optimized implementation, the column select circuitry includes a first column select circuitry 522 coupled to the first write driver 402 for selecting a bitline of a first subset of the set of bitlines; and a second column select circuitry 524 coupled to the second write driver 404 for selecting a corresponding bitline of a second subset of the set of bitlines.

In the illustrated example, the first subset of the set of bitlines and the second subset of the set of bitlines are overlapping sets, where the overlap is for columns 2 and 3 and the first write driver 402 couples to column 1 while the second write driver 404 couples to column 4. The illustrated configuration can write one or two words at a time. When one word is written, either the first write driver 402 or the second write driver 404 is used, depending on whether the first column or the fourth column is indicated for access.

In operation, the write drivers (e.g., first write driver 402 and second write driver 404) operate under a timing signal (e.g., WCLK) received from a control circuit (e.g., control circuit 140, 340). When the WCLK signal to the write drivers 402 and 404 triggers the write operation, both Din0 and Din1 can be written to the memory addresses of the columns as selected by the column select circuitry 520. The WCLK signal can be generated by the control circuit 140, 340 (and the circuitry generating the WCLK signal can be part of the various circuitry 346 of FIG. 3A). For example, state machine 350 of FIG. 3B can be used to trigger the timing signal for writing the plurality of new words to the plurality of addresses in a final cycle of the consecutive cycles of the read out of the plurality of words and can provide a final cycle for closing operations.

FIG. 6 illustrates a control circuit for controlling the start of the write operation in blast eviction-allocation. As described above, for a blast eviction-allocation of two words (e.g., reflected by two ones on address enable (BSTA)), the write operation is controlled to start from the $3^{rd}$ clock cycle and finish in the $4^{th}$ clock cycle. However, since the read operation would be active during the $3^{rd}$ clock cycle, the start of the write operation is delayed to allow the read operation to finish robustly.

For this purpose, the control circuitry 600 shown in FIG. 6 employs two multiplexers, first multiplexer 610 and second multiplexer 620, to determine when to start the write operation. A state machine 650 generates, among other intermediate/final outputs, two control signals—Control Signal S1 652 and Control Signal S2 654. In some cases, state machine 650 can be implemented such as described with respect to state machine 350 of FIG. 3B, with the BSTA and EVAN signals stored at registers 660 in order to provide the appropriate signals used for the multiplexers of the state machine 350 of FIG. 3B.

In the case of non-blast eviction-allocation write operation (e.g., EVAN active, but BSTEN inactive), the first multiplexer 610 allows CLK to pass through in the $1^{st}$ cycle. The second multiplexer 620 in this case also allows this CLK to pass through and start the write operation with BL precharge (e.g., BLPRECH as shown in FIG. 7B) being the first step of the write operation (as triggered by the output 670).

In the case of blast eviction-allocation operation (e.g., with BSTEN and EVAN active), the first multiplexer 610 only allows CLK to pass through in the $3^{rd}$ CLK cycle. In this case, the second multiplexer 620 is set to allow its second input to pass, which is a delayed version of the CLK (with amount of delay based on tracked delay circuit 680). This allows enough time from the $3^{rd}$ CLK so that the read operation finishes robustly, and only then the write operation is triggered (as triggered by the output 670). As seen in the legend inset of FIG. 6, For a write that is not during a blast eviction allocation (which is indicated by the GWEN input to the state machine 650, and where both BSTEN and the EVAN are inactive), the state of control signal S1 is 0. For a blast eviction allocation, the state of control signal S1 is 1. For a write that is not blast eviction allocation and during first clock or for a blast eviction allocation during a third clock, the state of control signal S2 is 0. For other cases, the state of control signal S2 is 1.

It should be noted that FIG. 6 merely presents one example implementation of the control circuitry through which the timing can be controlled, and there are multiple ways to achieve the intended control.

Figure 7A:
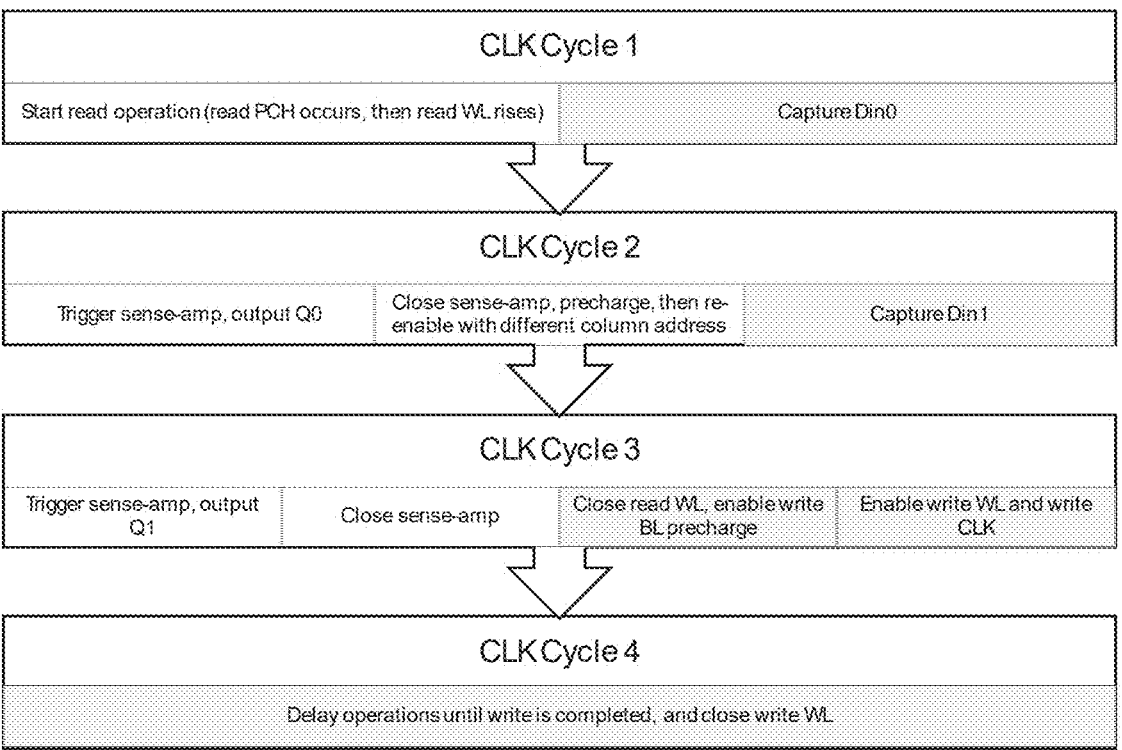
FIGS. 7A and 7B illustrate timing of operations for an example implementation of a blast eviction-allocation.
Figure 7B:
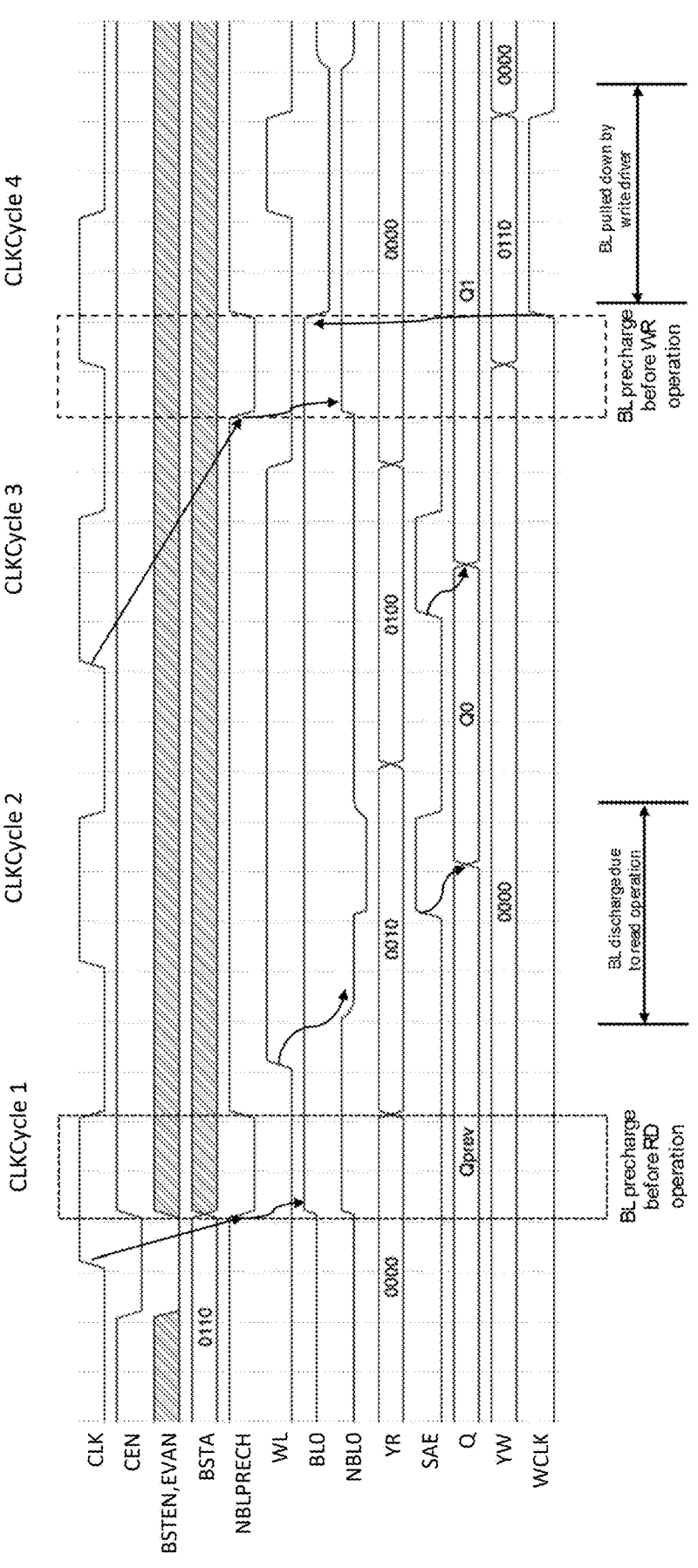

FIGS. 7A and 7B illustrate timing of operations for an example implementation of a blast eviction-allocation. In the illustrated example, a blast eviction allocation mode is taking place (reflected by both the BSTEN and EVAN signals being activated as shown in FIG. 7B). Referring to FIGS. 7A and 7B, in a first clock cycle (CLKCycle 1), activities related to a read operation and a write operation are performed. In particular, the start of a read operation can take place, with a precharge (PCH) taking place (as shown by NBLPRECH going low and the bitline BL0 going high to provide the bitline precharge before the read operation) and the word line (WL) going high during CLKCycle 1. In addition, for the write operation in the first clock cycle, the first data input (DIN0) is captured. With reference to FIG. 7B, it can be seen that during CLKCycle 1, based on an address select of 0110, the read column select YR is 0000.

Referring again to both FIGS. 7A and 7B, in a second clock cycle (CLKCycle 2), further activities related to the read operation and the write operation take place. In particular, for the read operation, the sense amplifier is triggered and Q0 is output. Then, while still in the second clock cycle, the sense amplifier enable is closed, precharge occurs, and the sense amplifier is reenabled with a different column address. In detail, with reference to FIG. 7B, SAE goes high during CLKCycle 2 to trigger the sense amplifier and, with 0010 selected by the read column select signal, Q0 can be output from the second column. The bitline (BL0) discharges due to the read operation. While still in the second clock cycle, it can be seen that the column select signal YR changes to the next column address 0100. Referring again to FIG. 7A, in the CLKCycle 2, for the write operation, the second data input (DIN1) is captured.

In a third clock cycle (CLKCycle 3), for the read operation, the sense amplifier is triggered again and Q1 is output. Then, while still in the third clock cycle, the sense amplifier enable is closed, completing the read operations. In addition, for the write operation, the read wordline is closed, the write bitline precharge is enabled, and then the write wordline and write clock (WCLK) are enabled. In detail, with reference to FIG. 7B, it can be seen that SAE goes high again during CLKCycle 3 and Q1 is read out. WL, which was high since the first clock cycle goes low and the bitline precharge (NBLPRECH) is activated. The control circuit of FIG. 6 shows one example for generating the delay to allow the read word line to fall after the read operation has finished. The read column select (YR) changes to 0000 as no columns need to be selected for read operations, and the write column select becomes 0110 to align with the two addresses indicated by the BSTA (and from which Q0 and Q1 were read).

Referring gain to both FIGS. 7A and 7B, in the fourth clock cycle (CLKCycle 4), the write operation is completed. During CLKCycle 4, the writing to the bitcells is delayed until precharge (NBLPRECH) completes, which is not triggered until later in the third clock cycle, to provide the sufficient time for the read operation to finish in the third clock cycle. To complete the write operation, the wordle line goes high and DIN0 and DIN1 are written using the write driver (which pulls down the bitline as needed).

Through the described circuitry, the data to be written (e.g., Din0, Din1) can be provided in consecutive cycles beginning at the start of the read operation without adversely affecting the read operation while taking advantage of the time being used to read out the data. In this manner, a total number of cycles of an eviction allocation operation can be one additional cycle to the read operation (e.g., four cycles for two words, where a final cycle of a read operation of the eviction allocation operation is three cycles and a next cycle completing the eviction allocation operation including a write operation of the eviction allocation operation is a fourth cycle of the four cycles).

As can be seen, it is possible to perform an eviction allocation process as part of a same access and in fewer cycles than if separately performing reading and writing operations with no overlap.

Certain embodiments of the illustrated methods and circuitry include the following.

Clause 1. A method of performing an eviction allocation in memory, the method comprising: receiving, at memory circuitry, control inputs indicating an eviction allocation operation comprising a read operation from a plurality of addresses and a write operation to a same plurality of addresses; in response to receiving the control inputs indicating the eviction allocation operation, performing the read operation of the plurality of addresses; and while performing the read operation of the plurality of addresses, loading data to be written to the same plurality of addresses into input registers of write circuitry of the memory circuitry.

Clause 2. The method of clause 1, further comprising: during a final cycle of the read operation of the plurality of addresses, triggering the data to be written to be stored at the plurality of addresses and closing the write operation in a next cycle.

Clause 3. The method of clause 1 or 2, wherein a first new word of the data to be written is loaded into a first input register in a first cycle of the read operation and a second new word of the data to be written is loaded into a second input register in a second cycle of the read operation.

Clause 4. The method of any of clauses 1-3, wherein the plurality of addresses comprises two addresses for a corresponding two words, wherein a total number of cycles of the eviction allocation operation is four cycles, the final cycle of the read operation being a third cycle and the next cycle being a fourth cycle.

Clause 5. The method of any of clauses 1-3, wherein for n number of addresses being accessed by the eviction allocation operation, an n+1 cycle is the final cycle of the read operation and an n+2 cycle is the closing of the write operation.

Clause 6. The method of any of clauses 1-5, wherein receiving, at the memory circuitry, control inputs indicating the eviction allocation operation comprising the read operation from the plurality of addresses and the write operation to the same plurality of addresses comprises: receiving, at a control circuit of the memory circuitry, control inputs comprising a blast enable signal, an address enable signal, and an evict-allocate enable signal.

Clause 7. The method of clause 6, wherein the control inputs indicate the eviction allocation operation when the evict-allocate enable signal and the blast enable signal are active, wherein the address enable signal indicates columns associated with the plurality of addresses.

Clause 8. The method of any of clauses 1-7, wherein performing the read operation of the plurality of addresses comprises reading out from the plurality of addresses in consecutive cycles.

Clause 9. A control circuit of a memory circuitry, the control circuit being structured to receive control inputs comprising a blast enable signal, an address enable signal, and an evict-allocate enable signal, wherein the control circuit comprises: a state machine comprising a plurality of state elements corresponding to a maximum number of available columns of a blast operation and an additional state element, wherein the plurality of state elements operate based on the address enable signal and the additional state element operates based on the evict-allocate enable signal.

Clause 10. The control circuit of clause 9, further comprising: a first multiplexer with a first selection signal controlled by the state machine that allows a clock signal to pass through in a first cycle when the blast enable signal and the evict-allocate enable signal are both inactive and a write enable signal is active and allows the clock signal to pass through in a final cycle of a read operation portion of a blast eviction allocation operation when the blast enable signal and the evict-allocate enable signal are active; a tracked delay circuit coupled to an output of the first multiplexer; and a second multiplexer having a first input coupled to the output of the first multiplexer and a second input coupled to a delay out of the tracked delay circuit, wherein the second multiplexer receives a second selection signal controlled by the state machine that allows the clock signal to pass through in the first cycle when the blast enable signal and the evict-allocate enable signal are both inactive and the write enable signal is active and allows a delayed clock signal to pass through in the final cycle of a read operation portion of the blast eviction allocation operation when the blast enable signal and the evict-allocate enable signal are active.

Clause 11. A memory circuitry for eviction allocation, the memory circuitry comprising: a memory array; read circuitry; write circuitry; and a control circuit coupled to the read circuitry and the write circuitry for operating the read circuitry and the write circuitry based on control inputs to the control circuit, wherein, in response to the control inputs indicating an eviction allocation operation comprising a read operation from a plurality of addresses and a write operation to a same plurality of addresses, the control circuit directs the read circuitry to read out a plurality of words from the plurality of addresses and, while the control circuit directs the read circuitry to read out the plurality of words, the control circuit directs the write circuitry to load a plurality of new words to be written to the same plurality of addresses into input registers of the write circuitry.

Clause 12. The memory circuitry of clause 11, wherein the control inputs to the control circuit include a blast enable signal, an address enable signal, and an evict-allocate enable signal, wherein the eviction allocation operation is performed when the evict-allocate enable signal and the blast enable signal are active.

Clause 13. The memory circuitry of clause 12, wherein the control circuit comprises: a state machine comprising a plurality of state elements corresponding to a maximum number of available columns of a blast operation and an additional state element, wherein the plurality of state elements operate based on the address enable signal and the additional state element operates based on the evict-allocate enable signal.

Clause 14. The memory circuitry of clause 13, wherein the state machine triggers a timing signal for writing the plurality of new words to the plurality of addresses in a final cycle of the read out of the plurality of words and provides a final cycle for closing operations.

Clause 15. The memory circuitry of clause 13 or 14, further comprising: a first multiplexer with a first selection signal controlled by the state machine that allows a clock signal to pass through in a first cycle when the blast enable signal and the evict-allocate enable signal are both inactive and a write enable signal is active and allows the clock signal to pass through in a final cycle of a read operation portion of a blast eviction allocation operation when the blast enable signal and the evict-allocate enable signal are active; a tracked delay circuit coupled to an output of the first multiplexer; and a second multiplexer having a first input coupled to the output of the first multiplexer and a second input coupled to a delay out of the tracked delay circuit, wherein the second multiplexer receives a second selection signal controlled by the state machine that allows the clock signal to pass through in the first cycle when the blast enable signal and the evict-allocate enable signal are both inactive and the write enable signal is active and allows a delayed clock signal to pass through in the final cycle of a read operation portion of the blast eviction allocation operation when the blast enable signal and the evict-allocate enable signal are active.

Clause 16. The memory circuitry of any of clauses 11-15, wherein the write circuitry comprises: a first write driver and at least one additional write driver for a set of bitlines coupled to bitcells of the memory array, wherein the first write driver and the at least one additional write driver operate under a timing signal received from the control circuit; and column select circuitry coupled to the first write driver and the at least one additional write driver for selecting bitlines of the set of bitlines; wherein the input registers of the write circuitry comprise: a first storage element coupled to an input data pin to receive data for storing in the memory circuitry; and at least one additional storage element coupled in series with the first storage element, wherein the first storage element and each of the at least one additional storage element are also coupled to output to a corresponding write driver of the first write driver and the at least one additional write driver for the set of bitlines.

Clause 17. The memory circuitry of clause 16, wherein the first storage element comprises a D flip flop and the at least one additional storage element comprises a latch.

Clause 18. The memory circuitry of any of clauses 11-17, wherein the plurality of addresses comprises two addresses for a corresponding two words.

Clause 19. The memory circuitry of clause 18, wherein a total number of cycles of the eviction allocation operation is four cycles, a final cycle of the read operation of the eviction allocation operation being three cycles and a next cycle completing the eviction allocation operation including the write operation of the eviction allocation operation being a fourth cycle of the four cycles.

Clause 20. The memory circuitry of any of clauses 11-19, wherein the control circuit directs the read circuitry to read out the plurality of words from the plurality of addresses in consecutive cycles.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of performing an eviction allocation in memory, the method comprising:
   receiving, at memory circuitry, control inputs indicating an eviction allocation operation comprising a read operation from a plurality of addresses and a write operation to a same plurality of addresses;
   in response to receiving the control inputs indicating the eviction allocation operation, performing the read operation of the plurality of addresses; and
   while performing the read operation of the plurality of addresses, loading data to be written to the same plurality of addresses into input registers of write circuitry of the memory circuitry.

2. The method of claim 1, further comprising:
   during a final cycle of the read operation of the plurality of addresses, triggering the data to be written to be stored at the plurality of addresses and closing the write operation in a next cycle.

3. The method of claim 2, wherein a first new word of the data to be written is loaded into a first input register in a first cycle of the read operation and a second new word of the data to be written is loaded into a second input register in a second cycle of the read operation.

4. The method of claim 2, wherein the plurality of addresses comprises two addresses for a corresponding two words, wherein a total number of cycles of the eviction allocation operation is four cycles, the final cycle of the read operation being a third cycle and the next cycle being a fourth cycle.

5. The method of claim 2, wherein for n number of addresses being accessed by the eviction allocation operation, an n+1 cycle is the final cycle of the read operation and an n+2 cycle is the closing of the write operation.

6. The method of claim 1, wherein receiving, at the memory circuitry, control inputs indicating the eviction allocation operation comprising the read operation from the plurality of addresses and the write operation to the same plurality of addresses comprises:
   receiving, at a control circuit of the memory circuitry, control inputs comprising a blast enable signal, an address enable signal, and an evict-allocate enable signal.

7. The method of claim 6, wherein the control inputs indicate the eviction allocation operation when the evict-allocate enable signal and the blast enable signal are active, wherein the address enable signal indicates columns associated with the plurality of addresses.

8. The method of claim 1, wherein performing the read operation of the plurality of addresses comprises reading out from the plurality of addresses in consecutive cycles.

9. A memory circuitry for eviction allocation, the memory circuitry comprising:
   a memory array;
   read circuitry;
   write circuitry; and
   a control circuit coupled to the read circuitry and the write circuitry for operating the read circuitry and the write circuitry based on control inputs to the control circuit, wherein, in response to the control inputs indicating an eviction allocation operation comprising a read operation from a plurality of addresses and a write operation to a same plurality of addresses, the control circuit directs the read circuitry to read out a plurality of words from the plurality of addresses and, while the control circuit directs the read circuitry to read out the plurality of words, the control circuit directs the write circuitry to load a plurality of new words to be written to the same plurality of addresses into input registers of the write circuitry.

10. The memory circuitry of claim 9, wherein the control inputs to the control circuit include a blast enable signal, an address enable signal, and an evict-allocate enable signal, wherein the eviction allocation operation is performed when the evict-allocate enable signal and the blast enable signal are active.

11. The memory circuitry of claim 10, wherein the control circuit comprises:
   a state machine comprising a plurality of state elements corresponding to a maximum number of available columns of a blast operation and an additional state element, wherein the plurality of state elements operate based on the address enable signal and the additional state element operates based on the evict-allocate enable signal.

12. The memory circuitry of claim 11, wherein the state machine triggers a timing signal for writing the plurality of new words to the plurality of addresses in a final cycle of the read out of the plurality of words and provides a final cycle for closing operations.

13. The memory circuitry of claim 11, further comprising:

a first multiplexer with a first selection signal controlled by the state machine that allows a clock signal to pass through in a first cycle when the blast enable signal and the evict-allocate enable signal are both inactive and a write enable signal is active and allows the clock signal to pass through in a final cycle of a read operation portion of a blast eviction allocation operation when the blast enable signal and the evict-allocate enable signal are active;

a tracked delay circuit coupled to an output of the first multiplexer; and a second multiplexer having a first input coupled to the output of the first multiplexer and a second input coupled to a delay out of the tracked delay circuit, wherein the second multiplexer receives a second selection signal controlled by the state machine that allows the clock signal to pass through in the first cycle when the blast enable signal and the evict-allocate enable signal are both inactive and the write enable signal is active and allows a delayed clock signal to pass through in the final cycle of a read operation portion of the blast eviction allocation operation when the blast enable signal and the evict-allocate enable signal are active.

14. The memory circuitry of claim 9, wherein the write circuitry comprises:

a first write driver and at least one additional write driver for a set of bitlines coupled to bitcells of the memory array, wherein the first write driver and the at least one additional write driver operate under a timing signal received from the control circuit; and column select circuitry coupled to the first write driver and the at least one additional write driver for selecting bitlines of the set of bitlines;

wherein the input registers of the write circuitry comprise:

a first storage element coupled to an input data pin to receive data for storing in the memory circuitry; and at least one additional storage element coupled in series with the first storage element, wherein the first storage element and each of the at least one additional storage element are also coupled to output to a corresponding write driver of the first write driver and the at least one additional write driver for the set of bitlines.

15. The memory circuitry of claim 14, wherein the first storage element comprises a D flip flop and the at least one additional storage element comprises a latch.

16. The memory circuitry of claim 9, wherein the plurality of addresses comprises two addresses for a corresponding two words.

17. The memory circuitry of claim 16, wherein a total number of cycles of the eviction allocation operation is four cycles, a final cycle of the read operation of the eviction allocation operation being three cycles and a next cycle completing the eviction allocation operation including the write operation of the eviction allocation operation being a fourth cycle of the four cycles.

18. The memory circuitry of claim 9, wherein the control circuit directs the read circuitry to read out the plurality of words from the plurality of addresses in consecutive cycles.

* * * * *